March 17, 1925.
J. F. MILLER ET AL
1,530,189
MEAT MOLD
Filed Sept. 20, 1923     2 Sheets-Sheet 1
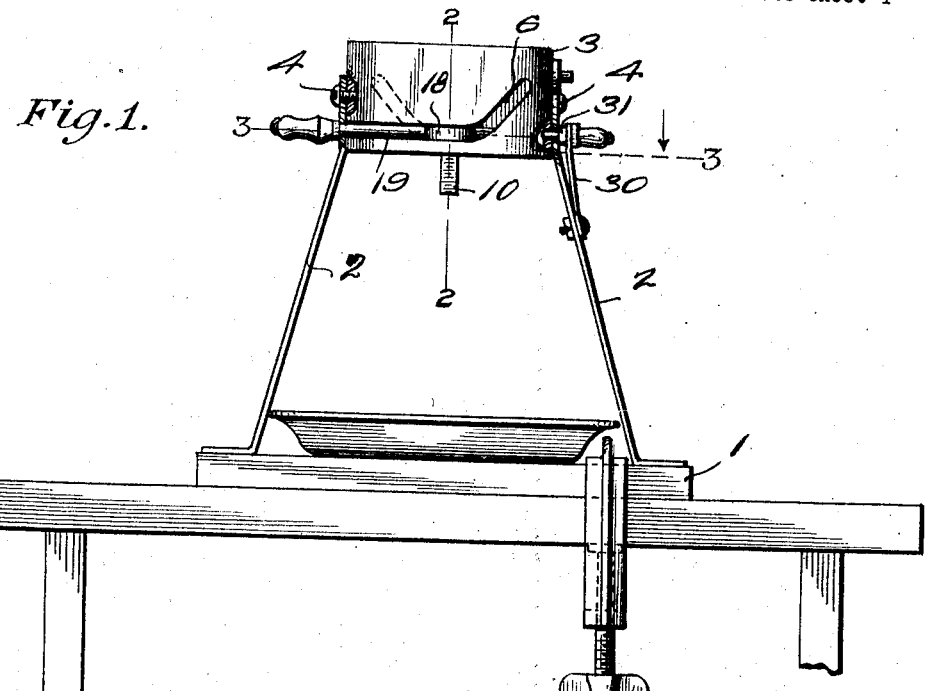
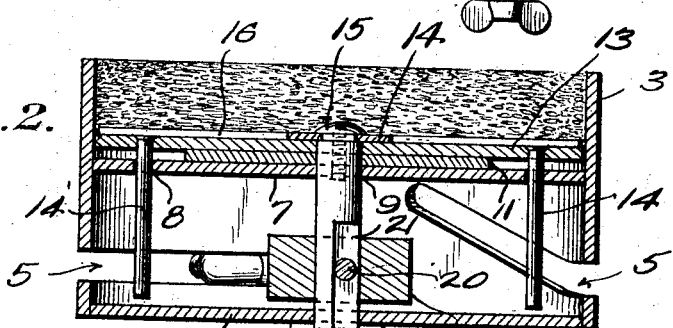
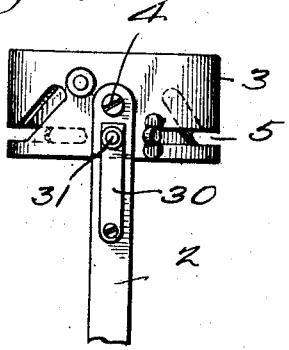
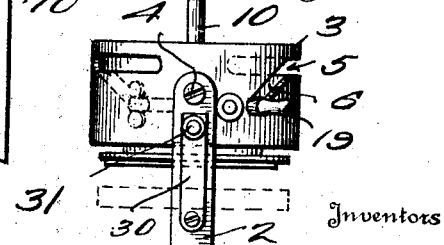
Inventors
J. D. Hetherington
J. F. Miller,
By Richard B. Owen
Attorney March 17, 1925.  
J. F. MILLER ET AL  
MEAT MOLD  
Filed Sept. 20. 1923  
1,530,189  
2 Sheets-Sheet 2

Inventors  
J.D. Hetherington  
J.F. Miller,  
By Richard B. Owen,  
Attorney

Patented Mar. 17, 1925.

1,530,189

UNITED STATES PATENT OFFICE.

JOHN F. MILLER AND JAMES D. HETHERINGTON, OF DAVENPORT, IOWA.

MEAT MOLD.

Application filed September 20, 1923. Serial No. 663,865.

*To all whom it may concern:*

Be it known that JOHN F. MILLER and JAMES D. HETHERINGTON, citizens of the United States, residing at Davenport, in the county of Scott and State of Iowa, have invented certain new and useful Improvements in Meat Molds, of which the following is a specification.

This invention relates to molds and is particularly adaptable for forming into cakes hamburg steaks, codfish, sausage meat, and other chopped and plastic food stuffs. The object of the invention is to provide a mold which is rapid, sanitary and reliable in operation, capable of forming cakes of uniform size, and provided with simple and efficient ejecting means and inverting means.

Other objects of the invention are to provide a device of this nature having a simple and efficient construction which may be manufactured at a comparatively low cost, and well adapted for the purpose for which it is designed.

With the above and numerous other objects in view which will appear as the description progresses, the invention resides in the novel features of construction and in the combination and arrangement of parts which will be hereinafter more fully described and claimed.

In the drawing:

Figure 1 is an elevation of the mold showing the same positioned upon a table;

Figure 2 is a vertical section taken through the mold substantially on the line 2—2 of Figure 1;

Figure 5 is a detail elevation of the mold taken at right angles to that shown in Figure 1;

Figure 6 is another detail elevation taken opposite to that shown in Figure 5, and;

Figure 3:
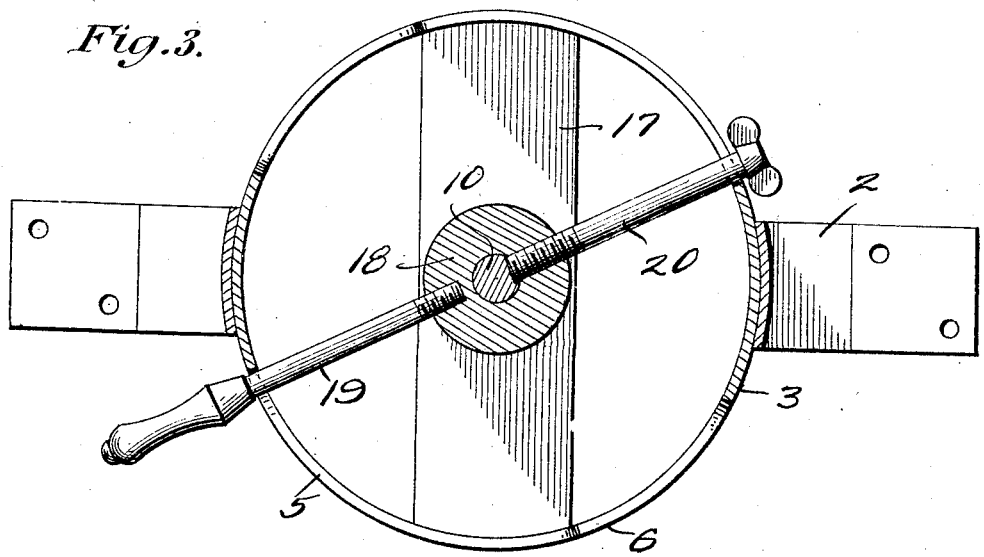
Figure 3 is a horizontal section taken substantially on the line 3—3 of Figure 1 looking downwardly.
Figure 4:
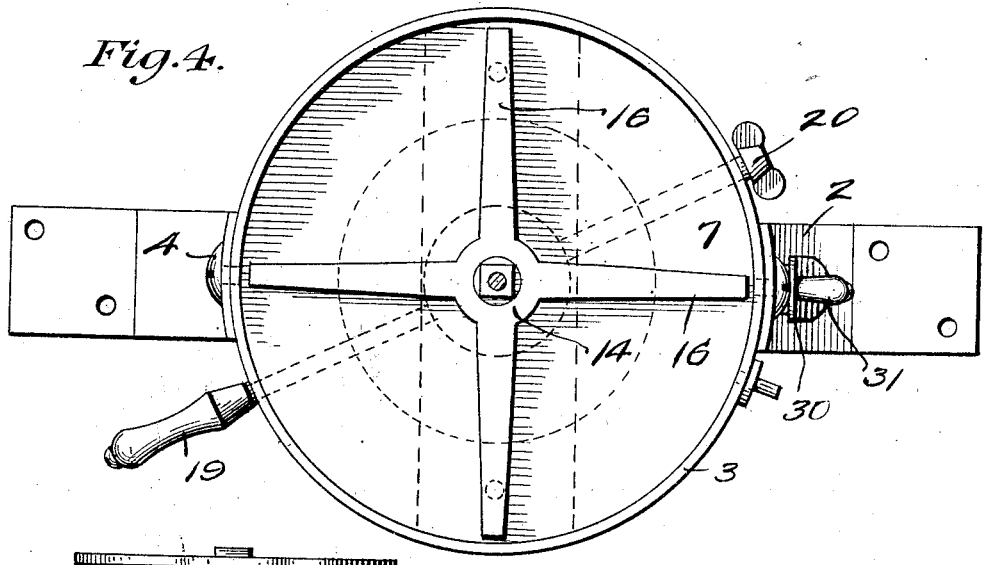
Figure 4 is a top plan view of the mold.
Figure 7:
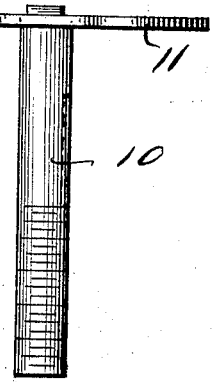
Figure 7 is an elevation of the ejecting standard.

Referring to the drawing in detail it will be seen that 1 designates a base plate upon which is mounted a pair of legs 2 which may be held in place on the plate 1 in any suitable manner. These legs preferably converge toward each other at their upper ends. The mold proper is indicated by the numeral 3 and is pivoted between the legs 2 at their upper ends by means of screws 4 which act as pintles for the mold. The mold 3 preferably is of cylindrical construction and its side wall is provided with a pair of oppositely disposed slots 5. A portion of each slot 5 is curved upwardly as at 6 forming a cam. A partition 7 is disposed in the mold 3 intermediate its ends and is provided with a pair of openings 8 adjacent its edge and a central opening 9. A standard 10 projects through the central opening 9 of the partition and is provided with a plate or washer 11 at its upper end which is suitably fixed to the standard. This plate or washer 11 is disposed above the partition 7. An ejector plate 13 is mounted on the standard 10 above the washer 11 and the standard 10 is adapted to rotate independently of this plate. In order to prevent rotation of the plate 13 it is provided with a pair of depending pins 14' extending through the openings 8 in the partition 7. A scraper 14 is mounted on the upper end of the standard 10 by means of a screw 15 so as to be rotatable with the standard 10 and includes a plurality of blades 16. A bar 17 is disposed transversely of the bottom of the mold through which the standard extends and that portion of the standard below this bar 17 is graduated and thus the thickness of the cakes to be formed in the mold may be ascertained and may be regulated as will be hereinafter more clearly set forth.

A block 18 is disposed about the standard 10 between the partition 7 and the bar 17. An arm 19 is threadedly engaged with this block and extends through one of the slots 5. Another arm 20 extends through the other slot 5 and threadedly pierces the block 18 and sectionally engages a flattened portion 21 on the standard 10 thus keying the block to the standard so that upon rotation of the block by the arm 19 the standard will also be rotated with the scraping member 14.

From the description as it has thus far progressed it will be seen that after the mold has been packed with meat or the like the arm 19 may be moved in the slot 5 thus rotating the standard 10 and the scraper 14. When the arm 19 reaches the cam 6 of the slot 5, the arm 20 will also reach the cam 6 of the slot through which it is extended and the standard 10 will be lifted so as to actuate the ejecting plate 13 and remove the cake from the mold. It is therefore evident that the thickness of the cake may be varied as desired by loosening the arm 20 and moving the standard vertically and then tightening the arm to frictionally engage the standard. The desired thickness may be ascertained from the graduation provided on the standard.

As was stated above the mold 3 is rotatable between the standards 2. In order to hold the mold in upright position we have provided one leg 2 with a leaf spring 30 from the end of which projects a pin 31 piercing the standard and the mold. When it is desired to invert the mold it is only necessary to remove the pin 31 from the standard and the mold and it may be inverted to the position shown in Figure 6 and then the plate 13 actuated by the arm 19 so as to actuate the scraping mechanism simultaneously with the ejecting plate.

Although we have described our invention with a certain degree of particularity, it is to be understood that changes in the details of construction and in the combination and arrangement of parts may be resorted to without departing from the spirit of the invention or sacrificing any of its advantages.

What is claimed is:

1. In a device of the class described, a mold, an ejecting plate in the mold, a scraping member associated with the plate, a standard for operation of the ejecting plate and rotation of the scraping member, a block disposed about the standard, an arm extending from the block and frictionally engaging the standard for rotation thereof and longitudinal movement thereof, said mold provided with a cam slot through which said arm projects.

2. In a device of the class described, a mold, a standard extending through the mold, said mold provided with a cam slot in its side, a rod connected to the standard and passing through the cam slot whereby it may be moved in the cam slot for rotation and longitudinal movement of the standard, an ejecting plate engaged with the standard, means for preventing rotation of the ejecting plate, and a scraping member associated with the ejecting plate and rotatable with the standard.

3. In a device of the class described, a mold, a partition in the mold provided with a plurality of apertures, an ejecting plate situated in the mold and provided with pins passing through openings in the partition, a standard passing through the ejecting plate and through the partition, means for connecting the ejecting plate through the standard in order that it may be moved up and down the mold, said mold provided with a cam slot, and a rod projecting from the standard through the slot whereby it may be moved thereby causing longitudinal and rotary movement of the standard all in the manner and for the purpose specified.

In testimony whereof we affix our signatures in presence of two witnesses.

JOHN F. MILLER.
JAMES D. HETHERINGTON.

Witnesses:
WERNER H. DALLENBACH,
FLOYD G. HIPPLE.